March 4, 1958    L. A. COLLIS    2,825,439
BEARINGS FOR ROLLER CONVEYORS

Filed Nov. 5, 1956    3 Sheets-Sheet 1

INVENTOR:
Leslie Alfred Collis
BY:
Baldwin & Wight
ATTORNEYS

March 4, 1958    L. A. COLLIS    2,825,439
BEARINGS FOR ROLLER CONVEYORS
Filed Nov. 5, 1956    3 Sheets-Sheet 2

INVENTOR:
Leslie Alfred Collis
BY:
Baldwin & Wight
ATTORNEYS

March 4, 1958  L. A. COLLIS  2,825,439
BEARINGS FOR ROLLER CONVEYORS

Filed Nov. 5, 1956 3 Sheets-Sheet 3

INVENTOR:
Leslie Alfred Collis
BY:
Baldwin & Wight
ATTORNEYS

United States Patent Office 2,825,439
Patented Mar. 4, 1958

2,825,439

BEARINGS FOR ROLLER CONVEYORS

Leslie Alfred Collis, Radlett, England, assignor to J. Collis & Sons Limited, London, England Application November 5, 1956, Serial No. 620,473

3 Claims. (Cl. 193—35)

This invention relates to conveyors. In the conveyance of loads on a roller conveyor the ideal state of affairs would be where the tops of all the rollers are level with one another and where the surface of the load in contact with the rollers is a perfect plane surface: in that case, the rollers would convey the load evenly.

In practice, however, such a state of affairs rarely, if ever, is encountered. In the first place, it would be necessary to employ precision engineering methods of construction, which is obviously uneconomic. In the second place, the surface of the load in contact with the rollers is almost invariably irregular and the departure from the ideal state of affairs due to this cause is greater than the departure due to non precision construction. The same considerations apply to conveyors known as wheel conveyors in which instead of rollers wheels are used, the wheels being arranged in sets each on a common spindle.

In the case of the lighter type of such conveyors, the parts such as bearing races and so on are formed by metal pressings and are therefore inclined to be noisy especially when, in a roller conveyor, the rollers are of tubular metal construction.

The main object of the present invention is to provide a construction of roller or wheel which can be produced by competitive engineering methods to ensure that they will share in carrying the load, despite irregularities in the load surface whereby the fatigue factor of the bearings is reduced and a reduction is effected in operating noise.

The invention is illustrated in the accompanying drawings in which Figures 1–6 are views showing the invention applied to a roller conveyor and Figure 7 is a view showing a wheel conveyor.

Figure 1:
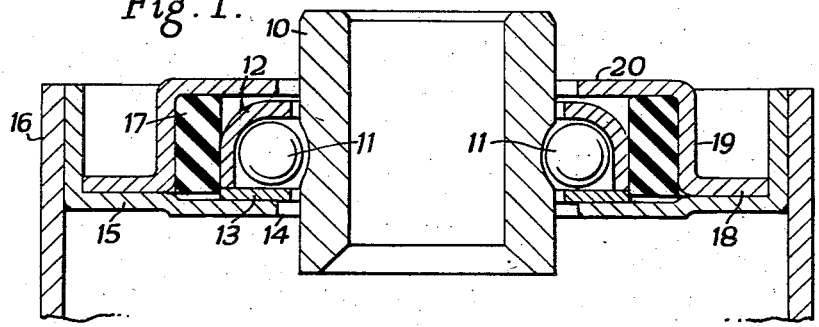
Figure 1 is a central section through a bearing intended for the heavier type of roller tube.

Referring now more particularly to Figure 1 of the accompanying drawings, a roller bearing comprises a sleeve 10 which forms the inner race about which are disposed balls 11. The outer race comprises a cup-shaped member 12 which is adapted to fit over the balls 11 on one side and is open at the bottom to allow the balls to be placed in position. The balls 11 are positioned by a cover plate 13 which itself is positioned by a housing cage 15 having a central opening 14 giving clearance to the sleeve 10 which is mounted on a supporting spindle.

On the outside of the outer race 12 is arranged a cylindrical resilient component 17 of rubber or other resilient material which is kept in place about the outer race 12 by a confining dished component. This component comprises an annular flange 18 which accurately locates the component to the housing cage 15, a cylindrical wall portion 19 which embraces the outer surface of the resilient component 17 and an inwardly projecting annular flange 20 which extends inwardly over the edge of the component 17 and of the outer race 12. The confining component is clear of the inner race 10 as is shown.

It will be clear that in the construction shown, the outer cage 15 although supported for free rotation, by the anti-friction bearing comprised of the outer race 12, the balls 11 and the inner race 10, from a supporting spindle to which the inner race 10 is fitted, can by reason of the resilient component 17 accommodate itself to irregularities in the contacting surfaces of the load being conveyed.

Figure 6:
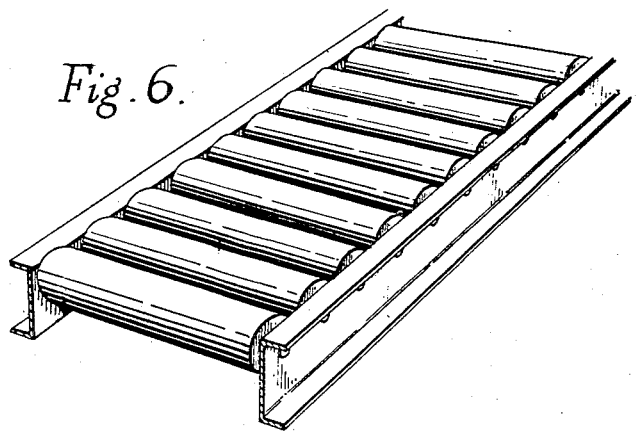
Figure 6 is a perspective view of a section of a roller conveyor.
Figure 7:
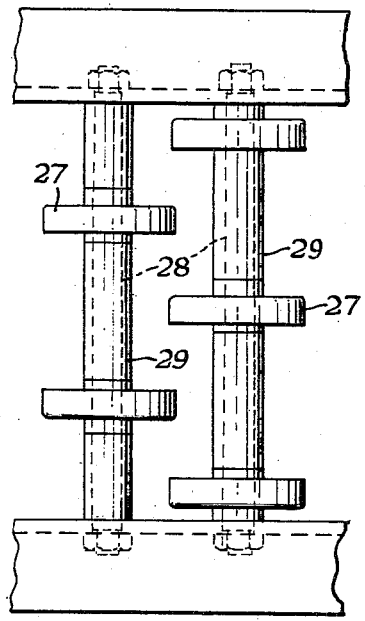
Figure 7 is a plan view of a wheel conveyor.

In the case of a roller conveyor, an assembly as that shown in Figure 1 would be housed by its cage 15 at each end of a tubular roller indicated at 16 in Figures 1 and 6: in the case of a wheel conveyor the cage itself could form the load engaging surfaces as is indicated in Figure 7, in which the wheels are shown at 27, the wheels being mounted in groups on a support 28 with interposed distance pieces 29.

It will also be clear that the housing cage 15 and the confining component 18, 19, 20 provide the two parts of a housing protecting the balls 11, the outer race 12 and the rubber component 17. In this, and in the other constructions of bearing hereinafter described, the means confining the elastic component between the outer race and, effectively the housing cage 15, is such that, whilst it holds the elastic component firmly in place, it does not compress it tightly so that the component is free to expand and contract with the various stresses imparted to the roller tube 16.

It has been found that when roller tubes 16 are supported by the bearing shown, the noise level at which the tubes 16 operate when a number is assembled to provide a conveyor is very considerably reduced: this can be due to the fact that because of the interposed rubber components 17 the impact on the bearings as the load passes from one tube 16 to another is reduced. This fact also contributes to a reduction in the fatigue factor which will result in an increased life for the bearings whether for a roller or for a wheel.

In addition bearing parts 10—21 form a self-contained unit which can be produced and assembled under factory conditions and then fitted to the tubes of a conveyor assembly; the accommodating action of the component 17 avoids the necessity for precise fitting in the roller assembly. Moreover, the unit can readily be removed and replaced by a similar fitting so enabling the maintenance of a roller conveyor to be simplified.

Figure 2:
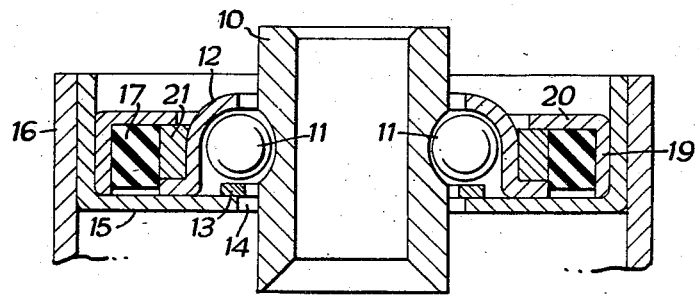
Figure 2 is a similar section of a modified form of bearing for a roller tube of medium carrying capacity.

Figure 2 shows an arrangement intended primarily for a medium type of conveyor: the arrangement is substantially the same as shown in Figure 1, with the exception that the flange 18 (of the confining component) is dispensed with and the wall 19 is itself secured to the inside of the housing cage 15. A metal ring 21 is in this case also inserted between the resilient component 17 and the outer race 12.

Figure 3:
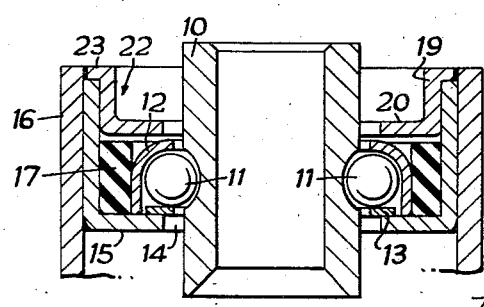
Figure 3 is again a central section through a construction of bearing adapted more particularly for the lighter type of roller tube.

In Figure 3 is shown a construction which differs from that shown in Figure 2 mainly in that the means confining the component 17 in position is modified. It comprises a cup-shaped member 22 which is lipped at its rim 23 to such an extent that a small space is left at the outside periphery of the housing 15. This arrangement of Figure 3 is useful where it is inconvenient to have any portion of the confining means extending radially between the component 17 and the housing 15.

Figure 4:
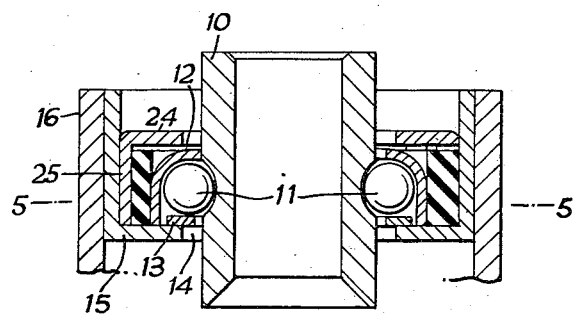
Figure 4 is a central section through a modification of the bearing illustrated in Figures 1 and 2, which is applicable more particularly to the lighter type of bearing shown in Figure 3.
Figure 5:
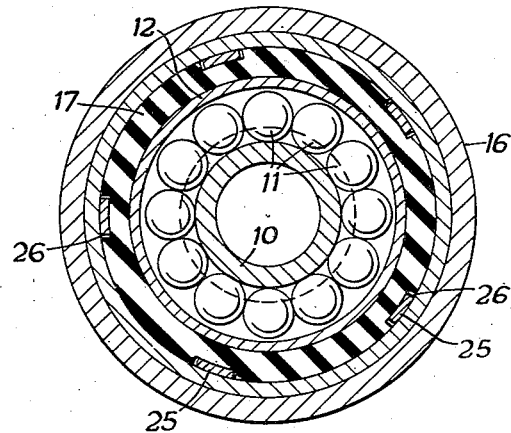
Figure 5 is a section on line 5—5 of Figure 4.

In the constructions so far described, the confining means have been cylindrical. This arrangement is not essential for it is possible to have, as is shown in Figures 4 and 5, a confining member in the form of a circular member 24 provided with spaced down-turned feet 25, these feet extending into gaps 26 in the circular resilient component 17. Whilst it is convenient also to form the resilient component 17 with recesses as shown at 26, it is also possible to have the component in the form of separate pieces of rubber or other similar material which are arranged around the bearing.

While the invention has its most important application to conveyor rollers of the tubular form, it would also be beneficial when applied to rollers of the solid kind, for the invention with its resilient means enables the fatigue factor on the bearings to be reduced.

Furthermore, while the disposition of the resilient means is most conveniently and advantageously interposed directly between the roller (whether of tubular or solid form) or the wheel and the shaft by which it is supported, the resilient means could be interposed between the bearings and the stationary support by which the shaft is carried and indeed the support itself could be so carried with the advantage of reducing the fatigue factor.

In addition the invention can with advantage be applied to conveyor rollers which run on plain bearings.

In the appended claims, the term "cylindrical component" has been employed as indicating a conveyor roller or a wheel, the terms "roller" and "wheel" being used when such parts are intended.

I claim:

1. For use in supporting the tubular metal rollers of a roller conveyor from a stationary support, a self-contained bearing unit comprising an inner race to fit it to the support, an outer race, anti-friction balls between the races, a housing to fit to the tubular roller, and a resilient component within the housing and interposed between the housing and the outer race with freedom to expand and contract under lateral movement of the housing with respect to the inner and outer races.

2. For use in supporting the tubular metal rollers of a roller conveyor from a stationary support, a self-contained bearing unit comprising an inner race to fit it to the support, an outer race, anti-friction balls between the races, a "two-part" housing to fit to the tubular roller, and a resilient component within the housing and interposed between the housing and the outer race with freedom to expand and contract under lateral movement of the housing with respect to the inner and outer races.

3. A roller conveyor comprising an assemblage of conveyor rollers each in the form of a hollow metal tube, a stationary support for each roller, and self-contained bearing units supporting each roller for rotation on its support, the bearing units comprising an anti-friction bearing mounted on the support, a housing secured to the roller and enclosing the anti-friction bearing, and a rubber component within the housing and interposed between the housing and the anti-friction bearing with freedom to expand and contract under the action of loading applied to the roller.

References Cited in the file of this patent

UNITED STATES PATENTS

| | | |
|---|---|---|
| 2,107,822 | Hahn | Feb. 8, 1938 |
| 2,158,364 | Hahn | May 16, 1939 |
| 2,234,162 | Anderson | Mar. 11, 1941 |
| 2,262,443 | Anderson | Nov. 11, 1941 |

FOREIGN PATENTS

| | | |
|---|---|---|
| 706,868 | Great Britain | Apr. 7, 1954 |